(12) United States Patent
Siebers et al.

(10) Patent No.: US 8,685,873 B2
(45) Date of Patent: Apr. 1, 2014

(54) LITHIUM-ALUMINOSILICATE GLASS WITH SHORT GLAZING TIMES

(75) Inventors: Friedrich Siebers, Nierstein (DE); Ulrich Schiffner, Mainz (DE); Wolfgang Schmidbauer, Mainz (DE); Klaus Schonberger, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/567,744

(22) Filed: Aug. 6, 2012

(65) Prior Publication Data

US 2012/0302422 A1 Nov. 29, 2012

Related U.S. Application Data

(63) Continuation of application No. 11/688,104, filed on Mar. 19, 2007, now abandoned.

(30) Foreign Application Priority Data

Mar. 20, 2006 (EP) .................................. 06005593

(51) Int. Cl.
 C03C 10/12 (2006.01)
 C03C 3/083 (2006.01)
(52) U.S. Cl.
 USPC .............................................. 501/68; 501/7

(58) Field of Classification Search
 USPC ............... 501/66, 68, 4, 7; 428/426, 428, 432
 See application file for complete search history.

(56) References Cited

U.S. PATENT DOCUMENTS

| 4,018,612 | A | | 4/1977 | Chyung et al. | |
|---|---|---|---|---|---|
| 4,093,468 | A | * | 6/1978 | Boitel et al. | 501/4 |
| 5,212,122 | A | * | 5/1993 | Pannhorst et al. | 501/69 |
| 5,434,111 | A | * | 7/1995 | Clement et al. | 501/63 |
| 6,846,760 | B2 | * | 1/2005 | Siebers et al. | 501/32 |
| 7,141,521 | B2 | | 11/2006 | Siebers | |
| 2008/0194394 | A1 | * | 8/2008 | Lecomte | 501/67 |

FOREIGN PATENT DOCUMENTS

| DE | 100 17 701 A1 | 10/2001 |
|---|---|---|
| FR | 2 405 906 A | 5/1979 |
| GB | 1070124 A | 5/1967 |

* cited by examiner

*Primary Examiner* — Noah Wiese
(74) *Attorney, Agent, or Firm* — Millen, White, Zelano & Branigan, P.C.

(57) ABSTRACT

A lithium-aluminosilicate glass or a corresponding glass ceramic that has a content of 0-0.4$SnO_2$, 1.3-2.7% by weight of $\Sigma SnO_2+TiO_2$, 1.3-2.5% by weight of $ZrO_2$, 3.65-4.3% by weight of $\Sigma ZrO_2+0.87$ ($TiO_2+SnO_2$), ≤0.04% by weight of $Fe_2O_3$, 50-4000 ppm of $Nd_2O_3$ and 0-50 ppm of CoO is described. The glass or the glass ceramic is color-neutral, has a turbidity of less than 1% HAZE and a high light transmission. The glazing time for conversion of the glass into glass ceramic is especially short with less than 2.5 hours.

21 Claims, 3 Drawing Sheets

LITHIUM-ALUMINOSILICATE GLASS WITH SHORT GLAZING TIMES

This application is a continuation of U.S. patent application Ser. No. 11/688,104, filed Mar. 19, 2007, which is incorporated by reference herein.

It is generally known that glasses from the $L_2O$—$Al_2O_3$—$SiO_2$ system can be converted into glass ceramics with high-quartz mixed crystals or keatite mixed crystals as main crystal phases.

The invention relates to a lithium-aluminosilicate glass that can be converted with short glazing times of less than 2.5 hours, preferably less than 100 minutes, into a transparent glass ceramic with high-quartz mixed crystals as a prevailing crystal phase and in this case is without visually disruptive light scattering (turbidity) or inherent color.

A key property of these glass ceramics is that in a temperature range from room temperature up to about 700° C., they have an extremely low thermal expansion coefficient $\alpha_{20/700} < 1.5 \cdot 10^{-6}$/K. These glass ceramics are therefore used in transparent form as, e.g., fire protection glass, fireplace door windows, cookware, and cooking surfaces, as well as substrate material for wafer stages or for mirror supports for telescopes and for reflectors in beamers.

In numerous applications of transparent glass ceramics, the latter are required in flat form, for example in the form of panes, as windows for fireplaces, for fire protection glazings, cooking surfaces with colored bottom coating and for display purposes. The production of such flat glass from the glass melt, which is used as a starting glass for the production of glass ceramics, is usually carried out by rolling and recently also by floating. For an economic production of these lithium-aluminosilicate glasses, on the one hand, a low melting point and a low processing temperature $V_A$ are desired; on the other hand, the glass must show no devitrification during shaping, i.e., no disruptive crystals should form that impair the resistance in the starting glasses and the glass ceramics that are produced therefrom. During shaping via rolling, the last contact of the glass melt is with the debiteuse that is made of noble metal (usually Pr/Rh) before the glass is formed by the rolling and is cooled.

In the industrial production of glass ceramic, first the starting glass is produced via conventional glass manufacturing processes. In the melt, typically arsenic oxide and/or antimony oxide is (are) used as a refining agent. These refining agents are compatible with the required glass ceramic properties and result in good bubble qualities in the melt. Also, $SnO_2$ is used as a refining agent in particular in connection with high-temperature refining above 1700° C.

After the melting and refining, the glass usually undergoes hot forming by rolling, pouring, pressing or, recently, floating. Then, the starting glass is converted into the glass-ceramic article by controlled crystallization. This glazing is carried out in a two-stage temperature process, in which nuclei, usually from $ZrO_2/TiO_2$ mixed crystals, are produced first by nucleation at a temperature of between 600 and 800° C. Also, $SnO_2$ can be involved in the nucleation. In the case of subsequent temperature increase, the high-quartz mixed crystals in these nuclei grow at the crystallization temperature of 800 to 900° C. If desired, the high-quartz mixed crystals can then also be converted into keatite mixed crystals. The conversion into keatite mixed crystals is carried out with a temperature increase in a temperature range of about 900 to 1200° C. As a rule, glass ceramics with keatite mixed crystals as a main phase are translucent or opaque and have a white color shade, which can be altered by the addition of colored oxides.

With the transfer of high-quartz mixed crystals to keatite mixed crystals, the thermal expansion coefficient of the glass ceramic is increased, and the transparency is reduced by the light scattering that is associated with the enlargement of the crystals.

For the quality of transparent glass ceramics with high-quartz mixed crystals as the main crystal phase, transparency and low inherent color are decisive. Transparency means that the glass ceramics are to have high light transmission in the visible range as well as low light scattering (turbidity). The low light scattering is achieved via a high nuclear density, which has the effect that the sizes of the growing high-quartz mixed crystals lie below the wavelength range of visible light. Typically, the mean crystallite size of the high-quartz mixed crystals is in the range of 20 to 80 nm. A high nuclear density requires sufficient contents of nucleating agents as well as sufficient nucleation times during the glazing.

It is disadvantageous in these glass ceramics that they regularly have a weak inherent coloring, which is undesirable per se.

The inherent color of transparent glass ceramic plates can have various causes. In the raw materials of the batch for the melts, the coloring element Fe is contained as a contaminant. Also, the use of refining agents $Sb_2O_3$ and $CeO_2$ results in a low inherent color. The described brownish-yellow inherent coloring of the transparent glass ceramics is based to a decisive extent on electronic transfers to color complexes, which absorb in the area of the visible light and in which the components that are necessary for the nucleation, the Ti ion, is involved. The most frequently absorbing color complex is the formation of adjacent Fe and Ti ions between which electronic charge-transfer transitions take place.

Sn/Ti complexes also produce an inherent color. The Fe/Ti color complexes result in a red-brown discoloration, and the Sn/Ti color complexes result in a yellow-brown discoloration. The formation of these adjacent color complexes takes place as early as during cooling of the starting glass and in particular during later glazing of the glass ceramics. In the melt, the ions are still dispersed uniformly, and during cooling, at high temperatures and during glazing, they preferably accumulate in a clustered manner. During glazing of the transparent glass ceramics, the inherent color is thus quite considerably intensified compared to the starting glass. By absorption in the short-wave portion of the visible spectrum, the transparent flat glasses and in particular the glass ceramics that are produced therefrom obtain a clear inherent color, which greatly increases with the thickness.

The glazing of the lithium-aluminosilicate glasses that consist of glass ceramics usually takes place in roller passage kilns or tunnel kilns. To avoid rough spots of the plates during the glazing, it is necessary that this kiln have a very good temperature homogeneity such that the top and bottom of the plates of the starting glasses crystallize simultaneously. Otherwise, process-induced distortions result. Because of these high requirements and the associated high acquisition costs of the glazing kiln, it is economically advantageous if the kilns can be run with high throughputs, i.e., that the total glazing time is kept as short as possible. This results in the conflict of purpose, however, that the starting glasses have to have a sufficient amount of nucleating agents so that in the conversion into the glass ceramic, no light scattering on large crystallites takes place (Tyndall Effect).

To ensure sufficient nucleation, however, minimum contents of the nucleating agent $TiO_2$ are necessary, since this nucleating agent can be replaced only disadvantageously in the case of melts and devitrification by the alternative nucleating agent $ZrO_2$. This means that the desired quick glazing times and short nucleation times with the $TiO_2$ contents required for this purpose result in an enhanced inherent color.

Many efforts have been made to reduce or to avoid these disruptive inherent colors that are based on an Fe/Ti complex.

The reduction of the Fe content is a measure that is economically usable only to a certain extent. A certain amount of $Fe_2O_3$ in the batch always develops through the industrially available raw materials of the batch for the production of the glass and by wear and tear from system parts for the production and homogenization of the batch. Based on the costs for extremely pure raw materials and special plant design measures, it is economically no longer justifiable to reduce the $Fe_2O_3$ content below about 50 ppm in transparent glass ceramics. The $Fe_2O_3$ content is usually on the order of magnitude of about 100 to 500 ppm.

U.S. Pat. No. 4,438,210 describes attempts to reduce the Fe/Ti color complex. Here, transparent glass ceramics with low inherent color are obtained, which contain 2-6% by weight of $TiO_2$ and 0-2% by weight of $ZrO_2$ as nucleating agents and up to about 0.1% by weight of $Fe_2O_3$ as contaminants, by the component MgO essentially being omitted.

JP 03-23237 A describes the production of transparent glass ceramics without inherent color. These glass ceramics avoid the addition of $TiO_2$ as nucleating agents and are based on a mixed nucleation by $ZrO_2/SnO_2$. The $SnO_2$ contents that are necessary for this purpose are more than 1% by weight. In the case of these high $SnO_2$ contents, however, the devitrification resistance of the glass deteriorates. In the area of shaping, in the case of viscosities around the processing temperature $V_A$ of $10^4$ dPas, a disruptive Sn-containing crystal phase crystallizes out. Thus, it results in an unreliable reduction of the strength of the glasses and the glass ceramics produced therefrom. Also, it has been shown that high $SnO_2$ contents result in a strong application of action of the glass melts on the noble-metal components, such as stirrers and electrodes. As a result, the service life of the noble-metal components is shortened.

In the patent specification JP 05-193985, a glass ceramic that is also $TiO_2$-free is described preferably for applications in fire protection glazing, which has the addition of $Nd_2O_3$ in contents of 0.2-1% by weight to stain over the inherent color produced by Fe ions. The glass ceramics are germinated by 3-7% by weight of $ZrO_2$. With these high $ZrO_2$ contents, however, the devitrification resistance of the glass deteriorates in the area of the shaping at viscosities around the processing temperature $V_A$. It crystallizes out $ZrO_2$ (baddeleyite) as a disruptive crystal phase.

U.S. Pat. No. 4,093,468 describes the use of $Nd_2O_3$ for the staining over of the color hue produced by the Fe/Ti color complex. From this patent specification, transparent glass ceramics almost without inherent color are known, which contain $TiO_2$ as a nucleating agent in contents of 0.5-6% by weight, a content of $Fe_2O_3$ with contamination up to 500 pm, and which are stained over by the addition of 0.03-0.75% by weight of $Nd_2O_3$. This patent specification describes that, in contrast to the conventional staining agents such as Co, Se, Cu, Cr, Mn, Ni, and V, $Nd_2O_3$ is especially well suited to neutralize the color hue produced by the Fe/Ti color complex.

However, the patent specification does not provide any indication as to how to achieve a high transparency, i.e., low turbidity and high light transmission, within short glazing times, by optimizing the nucleating agents. The examples of this patent contain disadvantageous nucleating agent combinations, thus high $TiO_2$ contents or nucleating agent concentrations that are too low. Owing to the deficient use of the alkalis $Na_2O$ and $K_2O$, the glasses, moreover, have an insufficient devitrification resistance. No assessment is made on the influence of the refining agent on the formation of the Fe/Ti color complex.

The principle of the staining over of an existing, undesirable color hue by nature results in a stronger absorption of light and thus reduces the light transmission. Since the existing absorption bands are neutralized with complementary absorption bands of the staining agent, overall a reduced light transmission is produced.

Another problem develops during recycling of the glass ceramic. It is a known fact that scrap glass, e.g., container glass, but also flat glass, is collected to a large extent and supplied to recycling in the form of cullets. Glass ceramic also finds its way into these cullets, and this results in problems, since the compositions that consist of $Li_2O$—$Al_2O_3$—$SiO_2$ glass systems have higher melting points and thus have a very disruptive effect on the lime-sodium glasses and their shaping during remelting. In the area of scrap Gullet recycling, optical processes are increasingly used, which separate the cullets based on their different absorption bands.

The object of the invention is to find a lithium-aluminosilicate glass,
which can be converted with glazing times of less than 2.5 hours into a glass ceramic with high-quartz mixed crystals as the prevailing crystal phase,
which has a neutral color and a good transparency,
which has an extremely low turbidity, and
which can be reliably recognized in optical cullet sorting facilities owing to its optical properties, and can be separated from used-glass cullet.

This object is achieved by the lithium-aluminosilicate glass that is described in Claim 1.

The contents of the nucleating components $TiO_2$, $ZrO_2$, and $SnO_2$ have to be kept within relatively narrow limits. In this case, however, certain minimum contents of these compounds are necessary to produce nuclei in high density in the desired short glazing times of less than 2.5 hours, preferably less than 100 minutes during the nucleation, so that after the high-quartz mixed crystals are grown, transparent glass ceramics can be produced without turbidity. With the high nuclear density, the mean crystallite size of the high-quartz mixed crystals remains limited to values of <80 nm, by which a disruptive light scattering is avoided. For an effective nucleation, minimum contents of $TiO_2$ and $ZrO_2$ are necessary.

The turbidity (English: haze) is to be less than 1%, preferably less than 0.5% (measured for a 3.6 mm-thick plate with polished surfaces on both sides). According to ASTM D 1003, turbidity is the proportion, in percentage, of the transmitted light, which deviates from the irradiated light beam on average by more than 2.5°.

It was found that the required quick glazing and the short glazing times that are required for this purpose can then be achieved with the nucleating agents $ZrO_2$, $TiO_2$ and $SnO_2$ if certain conditions are maintained. The nucleation action of $SnO_2$ and $TiO_2$ (in % by weight) is approximately the same, and thus these two components can be considered together. The nucleating action of $ZrO_2$ (in % by weight) is clearly greater. Therefore, combinations of the nucleating agents $ZrO_2$ and ($TiO_2+SnO_2$), which lie in a straight line in a corresponding diagram (FIG. 1), can be produced with identical nucleating action. For the slight turbidity at short glazing times according to the invention, a lower boundary line for the minimum contents of the nucleating agents is produced:

$$ZrO_2 = -0.87(TiO_2+SnO_2)+3.65.$$

For the preferred minimum contents of the nucleating agents (in % by weight), the following thus applies:

$$ZrO_2+0.87(TiO_2+SnO_2) \geq 3.65$$

Excessive nucleating agent contents result, however, in a deterioration of the devitrification behavior in shaping, as was already indicated. To ensure that the upper devitrification temperature (OEG) is below the processing temperature $V_A$, the upper limit for the nucleating agent contents (in % by weight) must follow the condition:

$$ZrO_2+0.87(TiO_2+SnO_2) \leq 4.3$$

The upper limit is also shown in FIG. 1.
In summary, the relationship reads:

$$3.65 \leq ZrO_2+=0.87(TiO_2+SnO_2) \leq 4.3$$

The sum of the $TiO_2$ and $SnO_2$ contents is not to exceed 2.7% by weight, however, since these components are involved in the formation of the Fe/Ti and Sn/Ti color complexes for the inherent color.

Additional limits are produced from the requirement for a good devitrification resistance $$ZrO_2 < 2.5\% \text{ by weight}$$

$$SnO_2 < 0.4\% \text{ by weight}$$

The content of $SnO_2$ is not to exceed 4% by weight, since otherwise, in the case of shaping near the processing point $V_A$, it results in an undesirable devitrification in the form of an Sn-containing crystal phase. The equivalent holds true for the content of $ZrO_2$, in which an upper limit of <2.5% by weight is to be maintained, so that devitrification in the form of a $ZrO_2$-containing crystal phase (baddeleyite) does not result. This is expressed by the upper devitrification limit that is to be below the processing temperature $V_A$. With these conditions, the acceptable range of the nucleating agent contents can be defined in a diagram (FIG. 1). For $ZrO_2$, the minimum contents of 1.3% by weight, and for $\Sigma SnO_2+TiO_2$, the minimum contents of 1.3% by weight are necessary to ensure a low turbidity (haze) of less than 1%.

In the lithium-aluminosilicate glasses according to the invention and the transparent glass ceramics produced therefrom, the disruptive inherent color that is based on Fe/Ti and/or Sn/Ti color complexes is reduced by additions of $Nd_2O_3$ in contents of 50-4000 ppm. Below 50 ppm of $Nd_2O_3$, the action is no longer reliable, and above 4000 ppm, either the transmission of the glasses is poor (with excessive $Fe_2O_3$ contents) or the inherent color of the Nd ion is disruptive. Contents of 100 to 4000 ppm and in particular 200 to 3000 ppm of $Nd_2O_3$ are preferred. An upper limit for the $N_2O_3$ content of less than 2000 ppm is quite especially preferred. The $Nd_2O_3$ contents are necessary to achieve the goal, according to the invention, of a reduction of the inherent color of the floated flat glasses and the transparent glass ceramics that are produced therefrom by staining over.

In addition, they are used to clearly label the flat glasses according to the invention and the glass ceramics that are produced therefrom and to improve the recyclability.

Additions of Nd have the advantage that this element of the red-brown coloring is especially readily counteracted by Fe/Ti or this element of the yellow-brown coloring is especially readily counteracted by Sn/Ti complexes. The color point that is measured in the various color systems, such as, e.g., in the CIE color system or the CIELAB (in short, lab) color system is readily shifted in the direction of the achromatic point by Nd. In addition, as a coloring ion from the 4f group of the periodic table, the Nd has a great number of characteristic absorption bands, which make possible a clear labeling. In the conversion into the transparent glass ceramic, these absorption lines are changed only slightly.

The labeling of the glass or the transparent glass ceramic that is produced therefrom can therefore be detected very easily with commercially available spectrometers. This allows the manufacturer of the original product to recognize his product and also ensures the simplified assignment of product liability in the event of damage or loss. A differentiation of transparent glass ceramics of various manufacturers is otherwise possible only via expensive analytical measuring methods, as they are available only in a few special laboratories.

The characteristic absorption lines for the Nd also make possible a detection and separation in preparation processes during recycling of old cullets that consist of lime-sodium glass. The addition of Nd for labeling is especially advantageous because of the characteristic absorption lines and the property thereof to fluoresce into infrared. Because of the above-mentioned properties, it is possible to keep cullets— originating from transparent glass ceramic that, because of the low inherent color, can be easily confused with, e.g., normal window panes from low-melting lime-sodium glass—from being incorporated into their preparation process and remelted. The danger exists in that unmelted remnants are formed by the high melting points of the lithium aluminosilicate glasses (and glass ceramics) compared to those of lime-sodium glasses. In the most advantageous case, this results in remnants that are still visually recognizable in the lime-sodium glass products; in the most disadvantageous case, this can result in clogging the channels or nozzles in the shaping process and thus in the total failure in the production of the lime-sodium glasses.

The lithium-aluminosilicate glasses according to the invention are to contain less than 400 ppm, preferably less than 200 ppm, of $Fe_2O_3$. Higher contents have the effect that even higher contents of the staining agent Nd are required to neutralize the color hue Fe/Ti. This results in lower light transmission and a visually observable gray hue. The contents of $Fe_2O_3$ can be minimized to an economically justifiable extent; smaller contents than about 50 ppm are no longer economical because of the high costs of Fe-free raw materials of the batch.

Additions of CoO in a total amount of up to 50 ppm to the Nd additive are advantageous to adjust the color point of the transparent glass ceramic more precisely in the direction of the achromatic point. The Nd additive by itself does not shift the color point exactly in the direction of the achromatic point, such that this slight correction may be advantageous. An amount of CoO from 1 to 50 ppm is preferred. Preferably, however, an upper limit for the CoO of 40 ppm, in particular 30 ppm, cannot be exceeded. For fine corrections of the color sites, other staining agents, such as, e.g., Cr, Ni, V, Cu, Mn, and Ce can also be added. The total amount should not exceed 100 ppm.

The oxides $Li_2O$, $Al_2O_3$ and $SiO_2$ are components of the high-quartz and/or keatite mixed crystal phases that are necessary within the preferred limits indicated in the claims. A minimum content of $Li_2O$ of 3% by weight is in general necessary, but $Li_2O$ contents of more than 4.5% by weight during the production process often result in an undesirable devitrification. A content of 3.2 to 4.3% by weight of $Li_2O$ leads to especially good results.

To avoid high viscosities of glasses and to suppress the tendency toward undesirable devitrification of mullite during shaping, the $Al_2O_3$ content is limited in the case of a preferred minimum content of 19% by weight to preferably a maximum 25% by weight, in particular 24% by weight. The $SiO_2$ content is preferably to be at most 69% by weight, in particular 68% by weight, since this component greatly increases the viscosity of the glass. Thus, higher contents of $SiO_2$ are disadvantageous for the melting of the glasses and with respect to the temperature stress during shaping. The minimum content of $SiO_2$ is preferably to be 55% by weight, in particular 60% by weight.

MgO, ZnO and $P_2O_5$ can be incorporated in the crystal phases as additional components. Because of the problem of forming undesirable crystal phases such as Zn spinel in the glazing, the ZnO content is limited to values of at most 2.5% by weight, preferably at most 2.0% by weight. The MgO content is limited to at most 2.0% by weight, preferably up to 1.5% by weight, since it otherwise unreliably increases the expansion coefficients of the glass ceramic. For low inherent color, MgO contents of less than 0.8% by weight and especially of less than 0.6% by weight are advantageous. A minimum MgO content of 0.1% by weight is generally required, so that the thermal expansion of the glass ceramic does not drop to negative values of below $0.3 \times 10^{-6}$/K.

The addition of alkalis $Na_2O$ and $K_2O$ to alkaline-earths CaO, SrO, and BaO as well as $B_2O_3$ improve the meltability and the devitrification behavior of the glass during shaping. The contents have to be limited, however, since these components essentially remain in the residual glass phase of the glass ceramic and increase the thermal expansion in an unreliable way. Also, higher contents can impair the crystallization behavior in the conversion of the glass into the glass ceramic and have a disadvantageous effect on the temperature resistance of the glass ceramic. The sum of the alkalis $Na_2O+K_2O$ is to be at least 0.2% by weight, preferably at least 0.3% by weight. The addition of $P_2O_5$ can be up to 3% by weight and is preferably limited to 1.5% by weight. The addition of $P_2O_5$ is advantageous for the devitrification resistance, but higher contents have a disadvantageous effect on the acid resistance.

The glasses according to the invention are refined with use of the refining agents arsenic oxide and/or antimony oxide that are conventional for glasses from the $Li_2O$—$Al_2O_3$—$SiO_2$ system. Also, $SnO_2$ can be added in particular in connection with a high-temperature refining >1700° C. as an alternative and/or in combination in amounts of up to 0.3% by weight. Other refining additives, such as, e.g., $CeO_2$, sulfate compounds, chloride compounds, and fluoride compounds can be added to the glass melts. The total content of the refining agent and additives is not to exceed 2% by weight.

The water content of the glasses according to the invention is usually between 0.015 and 0.06 mol/l, depending on the selection of the raw materials of the batch and the process conditions in the melts. This corresponds to $\beta_{OH}$ values of 0.16 to 0.64 $mm^{-1}$.

The glass according to the invention preferably has a composition (in % by weight based on oxide) of:

| | |
|---|---|
| $Li_2O$ | 3.0-4.5 |
| $Na_2O$ | 0-1.5 |
| $K_2O$ | 0-1.5 |
| $\Sigma Na_2O + K_2O$ | 0.2-2.0 |
| MgO | 0-2.0 |
| CaO | 0-1.5 |
| SrO | 0-1.5 |
| BaO | 0-2.5 |
| ZnO | 0-2.5 |
| $B_2O_3$ | 0-1.0 |
| $Al_2O_3$ | 19-25 |
| $SiO_2$ | 55-69 |
| $TiO_2$ | 1.4-2.7 |
| $ZrO_2$ | 1.3-2.5 |
| $SnO_2$ | 0-0.4 |
| $\Sigma SnO_2 + TiO_2$ | <2.7 |
| $P_2O_5$ | 0-3.0 |
| $Nd_2O_3$ | 100-4000 ppm |
| CoO | 0-40 ppm | optionally with the additions of chemical refining agents such as $As_2O_3$, $Sb_2O_3$, and $CeO_2$ and optionally additional refining additives, such as, for example, sulfate compounds, chloride compounds, and fluoride compounds in total amounts of up to 2% by weight. In this information, the Nd content is converted into an oxide base ($Nd_2O_3$), whereby the type of Nd additive in the batch is not limited to the indicated oxide, but rather any Nd compounds can be added.

In an especially preferred embodiment of the invention, the glass has a composition, in % by weight based on oxide, of:

| | |
|---|---|
| $Li_2O$ | 3.2-4.3 |
| $Na_2O$ | 0.2-1.0 |
| $K_2O$ | 0-0.8 |
| $\Sigma Na_2O + K_2O$ | 0.3-1.5 |
| MgO | 0.1-1.5 |
| CaO | 0-1.0 |
| SrO | 0-1.0 |
| BaO | 0-2.5 |
| ZnO | 0-2.0 |
| $Al_2O_3$ | 19-24 |
| $SiO_2$ | 60-68 |
| $TiO_2$ | 1.4-2.7 |
| $ZrO_2$ | 1.3-2.2 |
| $SnO_2$ | 0-0.3 |
| $\Sigma SnO_2 + TiO_2$ | <2.7 |
| $P_2O_5$ | 0-1.5 |
| $Nd_2O_3$ | 200-3000 ppm |
| CoO | 0-30 ppm | optionally with the additions of chemical refining agents such as $As_2O_3$, $Sb_2O_3$, and $CeO_2$ and refining additives such as sulfate compounds, chloride compounds, and fluoride compounds in total amounts of up to 1.5% by weight.

In the ease of low refining agent contents of $As_2O_3$, $Sb_2O_3$ and/or also $SnO_2$, it may be necessary to combine the chemical refining with a high-temperature refining above 1700° C., if good bubble qualities with numbers of bubbles of below 5 bubbles/kg of glass (relative to bubble sizes of greater than 0.1 mm) are desired.

For the inherent color, it is especially advantageous if the glass ceramic plate contains $As_2O_3$ as a refining agent, optionally with additional refining additives such as sulfate, chloride and fluoride compounds in total contents of up to 1% by weight and is plained without the refining agents $Sb_2O_3$ and $SnO_2$.

By using 0.1-0.4% by weight of $SnO_2$ as a refining agent in combination with a high-temperature refining above 1700° C., it is possible to eliminate the refining agents $As_2O_3$ and $Sb_2O_3$ that are disadvantageous from environmental standpoints and to obtain devitrification-stable starting glasses (OEG<$V_A$) with good bubble qualities. Since, however, Sn forms a colored Sn/Ti complex with Ti, an amount of 0.1 to 0.3% by weight of $SnO_2$ is preferred for refining.

The lithium-aluminosilicate glass according to the invention is typically characterized by a processing temperature $V_A$ under 1350° C. to promote the meltability of the glass and to limit the thermal stress on the system components during shaping. In this case, the upper devitrification temperature OEG is below the processing temperature $V_A$.

After conversion into the transparent glass ceramic with high-quartz mixed crystals as the main crystal phase, the thermal expansion coefficient $\alpha_{20/700}$ is to deviate no more than $0.5 \cdot 10^{-6}$/K from the zero expansion. The deviation is preferably to be less than $0.3 \cdot 10^{-6}$/K. With the low thermal expansion coefficients, a high temperature difference resistance of the glass ceramic is achieved. A preferred embodiment of the invention consists in that, in addition to the low turbidity, a low inherent color and a high light transmission are also to be provided. The transparent glass ceramic then has a turbidity with a haze-value of <1%, preferably <0.5% (with a 3.6 mm thickness), in transmission at a 4 mm thickness via a variegation of colors in the CIELAB color system of C*<3.5 and a light transmission (brightness) Y of >80%, preferably >85%. This combination of properties is possible with the low $Fe_2O_3$ contents that are matched to one another according to the invention, the limitation of the contents of the staining agent $Nd_2O_3$ to less than 2000 ppm and CoO to less than 20 ppm in combination with the specifically defined contents of the nucleating agents $TiO_2$, $SnO_2$ and $ZrO_2$.

The lithium-aluminosilicate glasses according to the invention can be converted by an additional temperature treatment at temperatures of between about 900 and 1200° C. into a keatite mixed crystal-containing glass ceramic. Glass ceramics of this type have a higher temperature resistance, but at the expense of an increase in the thermal expansion coefficient, which is to be less than $1.5 \cdot 10^{-6}$/K (between room temperature and 700° C. Because of the crystal growth that accompanies the conversion, they have a translucent to opaque-white appearance. The turbidity is generally >50% in haze values.

The transparent, colorless glass ceramic with high-quartz mixed crystals that is produced from the lithium-aluminosilicate glass by glazing according to the invention is used as fire protection glass, fireplace door windows, oven door windows, in particular for a pyrolysis oven, and covers for high-power lights. By applying a light-absorbing bottom coating, a colored cooking surface with the required light transmission can be produced from the transparent glass ceramic. After conversion into a glass ceramic with keatite mixed crystals as a main crystal phase, the latter in translucent or opaque form is preferably used as a cooking surface or as a cover panel in microwave ovens.

This invention becomes clearer with the aid of the following examples.

For some embodiments, compositions and properties of the lithium-aluminosilicate glasses are cited in Table 1. In this case, glasses 1 to 8 are glasses according to the invention and glasses 9 and 10 are comparison glasses that are outside of this invention. The comparison glass No. 10 was taken from U.S. Pat. No. 4,093,468 (Example B).

Table 1 shows the compositions of the starting glasses Nos. 1 to 8 according to the invention and the starting glasses 9 and 10 for the comparison examples.

In Table 1, the properties in the vitreous state, such as, e.g.: transformation temperature Tg, processing temperature $V_A$, upper devitrification limits OEG, thermal expansion between room temperature and 300° C., as well as the density, are also cited. Based on the composition, in particular the nucleating agent contents, the upper devitrification limit is below the processing temperature $V_A$. In Table 1, the $Fe_2O_3$ contents produced by the raw material contaminants are cited in the compositions. The water content of the glasses is 0.03-0.05 mol/l, corresponding to $\beta_{OH}$ values of 0.32 to 0.53 mm$^{-1}$.

The starting glasses of Table 1 were melted and plained from the raw materials, common in the glass industry, at temperatures of about 1620° C. After melting in crucibles that consist of sintered silica glass, the melts were poured into the Pt/Rh crucible with an inside crucible made of silica glass and homogenized at temperatures of 1550° C. for 30 minutes while being stirred. After standing at 1640° C. for 2 hours, castings of about 140×100×30 mm in size were poured and cooled in an annealing furnace, beginning from about 660° C. to room temperature. The castings were divided into the sizes required for the tests and for the glazing.

The glazings of the starting glasses were carried out with the following temperature/time programs:

Glazing Program 1, (Total Time 147 Minutes):
Heating within 50 minutes from room temperature to 790° C.
30 minutes of holding time at 790° C.
Heating within 30 minutes from 790 to 900° C.
7 minutes of holding time at 900° C.
Cooling within 30 minutes from 900 to 750° C.
Quick cooling to room temperature Glazing Program 2, (Total Time 96 Minutes):
Heating within 38 minutes from room temperature to 790° C.
14 minutes of holding time at 790° C.
In 24 minutes from 790 to 910° C.
10 minutes of holding time at 910° C.
Cooling within 10 minutes from 910 to 800° C.
Quick cooling to room temperature Glazing Program 3, (Production of Keatite Mixed Crystal Glass Ceramic):
Heating within 33 minutes from room temperature to 790° C.
30 minutes of holding time at 790° C.
Additional heating within 32 minutes from 790° C. to a maximum temperature $T_{max}$
7 minutes of holding time at $T_{max}$
Quick cooling to room temperature Tables 2 and 3 show the properties of the transparent glass ceramics with high-quartz mixed crystals as the prevailing crystal phase, which were produced with the glazing programs 1 or 2. Examples 9 and 10 or 19 and 20 are comparison ceramics outside of the invention. The transmission measurements were made on polished plates with a thickness of 4 mm and with standard illuminant C, 2°. In addition to the color coordinates L*, a*, b* in the CIELAB system, the color coordinates x and y in the CIE system are cited. The glass ceramics according to the invention confirm the advantageous action of the Nd feedstock and optionally in addition Co for reducing the disruptive inherent color. Also, the Yellowness Index according to Standard ASTM 1925/70 (77, 85) is, like the variegation of colors C*, a measurement of the inherent color. High values of the light transmission (brightness) Y are also achieved. The turbidity was measured with standard illuminant C on 3.6 mm-thick plates that are polished on both sides and with a commercial "haze-guard plus" measuring device of the BYK-Gardner Company and characterized by the haze value.

For the glazing program with total times of 147 minutes and 96 minutes, low degrees of turbidity (haze values) are achieved by the selection of the nucleating agents.

For the glazing program 1, additional property values of the glass ceramic, such as infrared transmission at 1600 nm, thermal expansion between 20 and 700° C., density and the phase content of the main crystal phase that is measured by means of x-ray diffraction, consisting of high-quartz mixed crystals, as well as the mean crystallite size, are shown in Table 2.

In addition, some examples with the glazing program 3 were converted into translucent glass ceramics with keatite mixed crystals as the prevailing crystal phase, and their properties as well as phase contents and crystal sizes were determined (Table 4). The maximum temperatures $T_{max}$ in the production are indicated in the table. The light transmission Y and the IR transmission at 1600 nm were measured on 3.6 mm-thick plates. The color values L*, a* and b* were determined in remission (incident light) on 3.6 mm-thick polished plates with the Mercury 2000 measuring device (Datacolor Company, Lawrenceville, USA), standard illuminant C, 2°. The haze values of the examples (polished plates, 3.6 mm thick) are more than 90%.

TABLE 1

Figure 1:
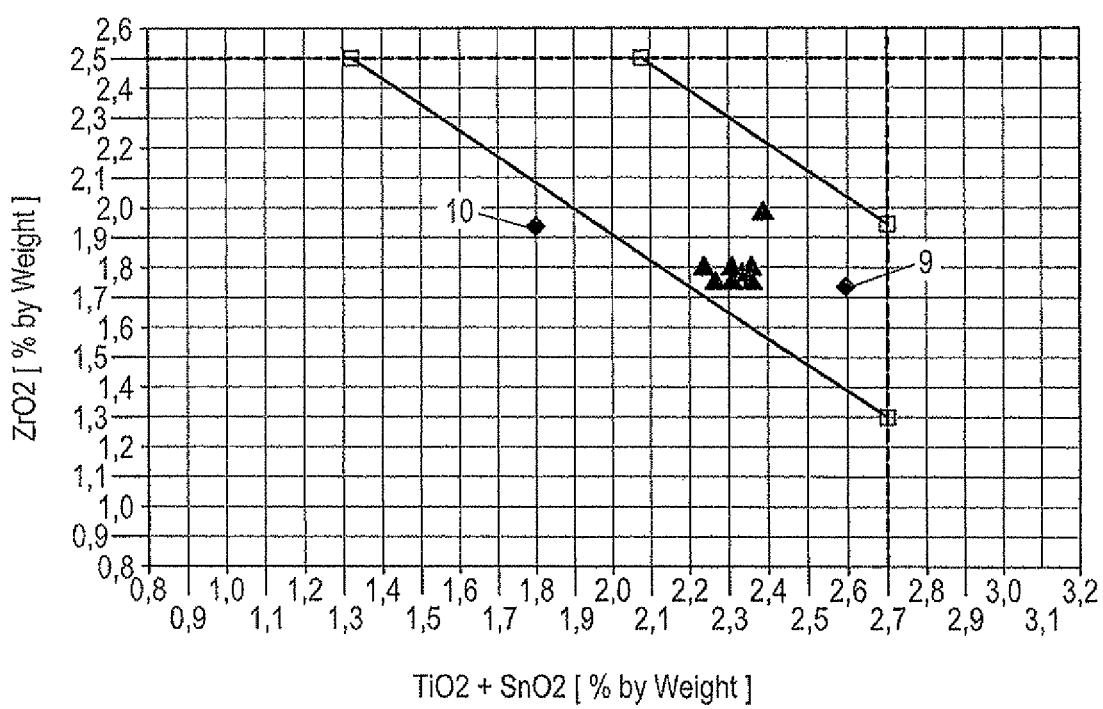
FIG. 1 shows a plot of the nucleating agent concentration of the glass ceramics according to the invention and the comparison ceramics (starting glasses 9, 10) within the indicated limits.
Figure 2:
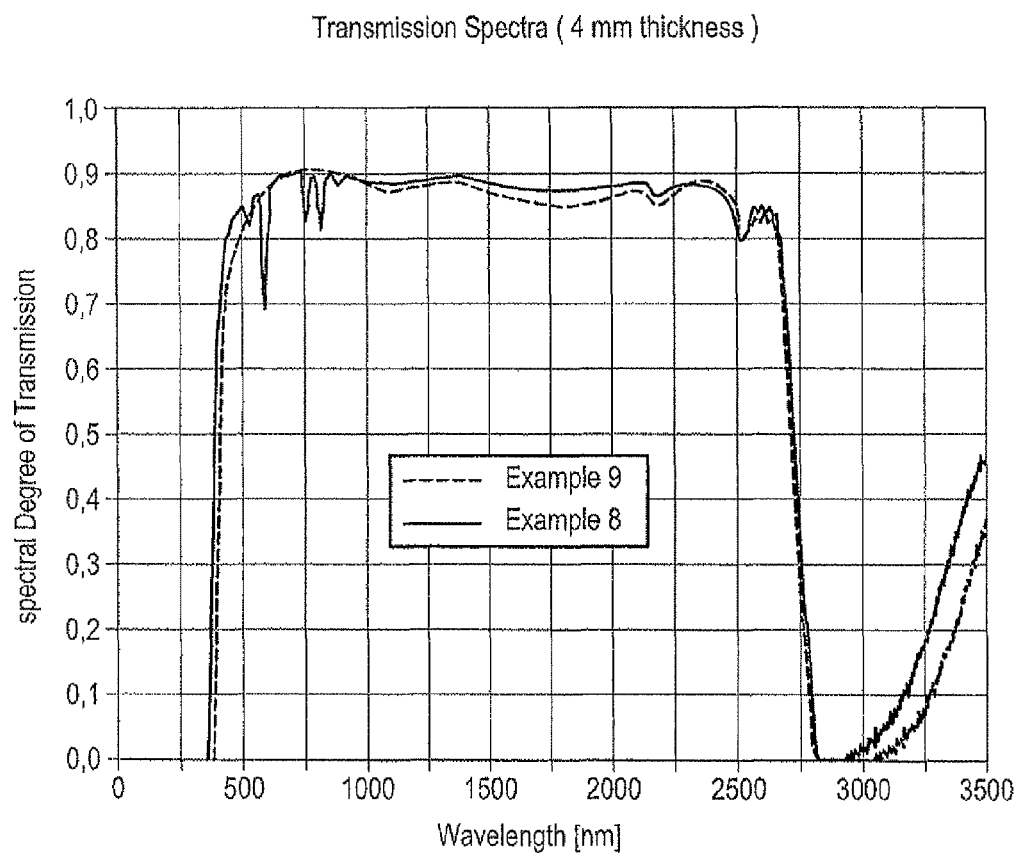
FIG. 2 shows the transmission spectra of the glass ceramic of Example 8 according to the invention and the comparison glass ceramic of Example 9. The comparison example shows the disruptive coloring associated with a high Yellowness Index and the variegation of colors C*. The glass ceramic according to the invention shows the characteristic absorption bands of the Nd ion, which are also extremely well suited for labeling the glass ceramic plates according to the invention. Moreover, the $Nd_2O_3$ addition also simplifies the recyclability of the glass ceramic by optical cullet-separating processes based on the absorption bands and the infrared fluorescence of the Nd ion.
Figure 3:
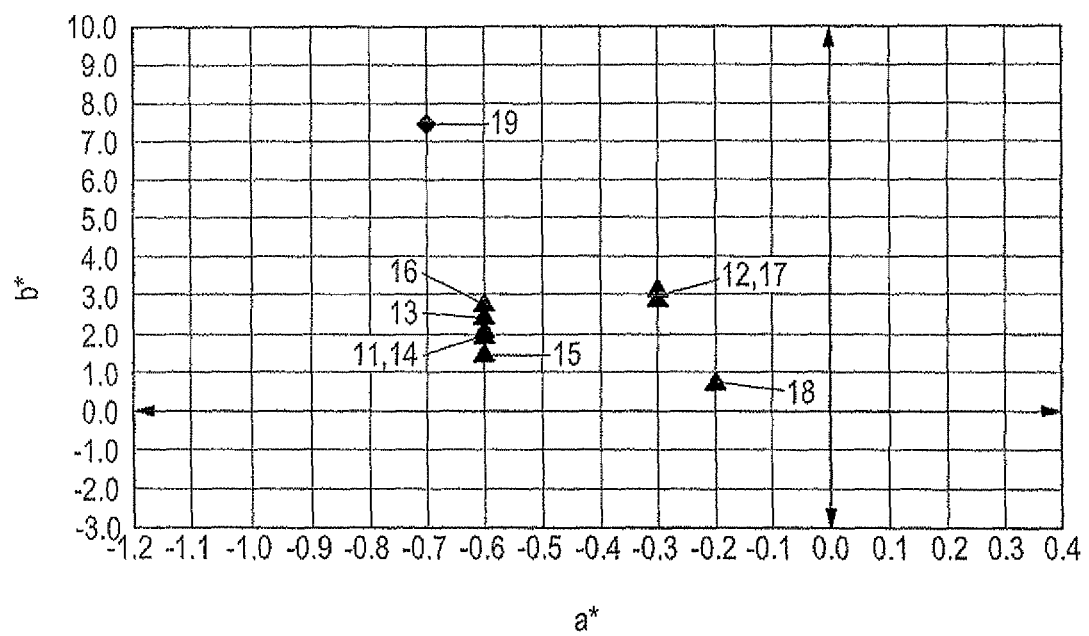
FIG. 3 shows the color coordinates of the glass ceramics 11 to 18 according to the invention and the comparison glass ceramic of Example 19 in the CIELAB system. The comparison glass ceramic of Example 20 cannot be usefully categorized owing to its high turbidity (milky appearance).

Compositions and Properties of Starting Glasses According to the Invention and Comparison Glasses 9 and 10

| Compositions in % by Weight Based on Oxide | | Glass No. | | | | | | | | | |
|---|---|---|---|---|---|---|---|---|---|---|---|
| | | 1 | 2 | 3 | 4 | 5 | 6 | 7 | 8 | 9 | 10 |
| Al2O3 | | 21.3 | 21.3 | 21.8 | 21.65 | 20.0 | 19.95 | 20.1 | 20.0 | 19.9 | 21.3 |
| BaO | | — | — | 1.98 | 1.95 | 0.80 | 0.84 | 0.82 | 1.21 | 0.9 | 1.3 |
| K2O | | 0.13 | 0.11 | — | — | 0.20 | 0.20 | 0.20 | — | 0.22 | — |
| Li2O | | 3.75 | 3.70 | 3.69 | 3.64 | 3.54 | 3.75 | 3.65 | 3.63 | 3.6 | 2.7 |
| MgO | | 0.85 | 1.05 | 0.58 | 0.59 | 1.15 | 1.06 | 1.10 | 0.77 | 1.2 | 1.0 |
| Na2O | | 0.35 | 0.36 | 0.52 | 0.50 | 0.15 | 0.16 | 0.15 | 0.45 | 0.20 | — |
| P2O5 | | — | — | — | — | — | — | — | — | — | 0.7 |
| SiO2 | | 67.55 | 67.35 | 65.3 | 65.2 | 68.1 | 67.35 | 67.4 | 67.22 | 67.2 | 62.0 |
| ZnO | | 1.57 | 2.0 | 1.70 | 1.57 | 1.48 | 1.60 | 1.54 | 1.57 | 1.55 | 6.0 |
| CaO | | | | | | | | | | | 0.50 |
| SnO2 | | — | 0.11 | — | — | — | — | — | — | — | — |
| TiO2 | | 2.23 | 2.19 | 2.29 | 2.38 | 2.26 | 2.35 | 2.35 | 2.33 | 2.59 | 1.8 |
| ZrO2 | | 1.76 | 1.80 | 1.76 | 1.98 | 1.76 | 1.80 | 1.76 | 1.77 | 1.75 | 2.0 |
| As2O3 | | 0.40 | — | 0.28 | 0.43 | 0.40 | 0.86 | 0.85 | 0.86 | 0.86 | 0.7 |
| Sb2O3 | | — | — | — | — | — | — | — | — | — | — |
| Nd2O3 | | 0.09 | 0.02 | 0.08 | 0.09 | 0.14 | 0.06 | 0.06 | 0.17 | — | 0.15 |
| Fe2O3 | ppm | 200 | 100 | 180 | 200 | 200 | 140 | 150 | 160 | 290 | 100 |
| CoO | ppm | — | — | — | — | — | — | — | 5 | — | — |
| NiO | ppm | — | — | — | — | — | — | 23 | — | — | — |
| Tg | °C. | 681 | 685 | 6.76 | 687 | 692 | 669 | 682 | 672 | 673 | 673 |
| $V_A$ | °C. | 1320 | 1320 | 1306 | — | 1335 | 1315 | — | 1325 | 1304 | 1281 |
| OEG | °C. | 1240 | 1270 | 1250 | — | 1255 | 1280 | — | 1265 | 1265 | 1340 |
| $\alpha_{20/300}$ | $10^{-6}$/K | 3.87 | 3.88 | 4.08 | 4.05 | 3.79 | 3.90 | 3.90 | 3.91 | 3.87 | 3.56 |
| Density | g/cm³ | 2.436 | 2.446 | 2.472 | 2.479 | 2.444 | 2.451 | 2.450 | 2.447 | 2.454 | 2.562 |

TABLE 2

Properties of Glass Ceramics According to the Invention and Comparison Glass Ceramics of Examples 9 and 10 (Glazing Program 1)

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| | | | | | | Glass No. | | | | | |
| | | 1 | 2 | 3 | 4 | 5 | 6 | 7 | 8 | 9 | 10 |
| Transmission Standard Illuminant C, 2° | 4 mm Thickness % | | | | | | | | | | |
| Light Transmission Y | | 87.0 | 87.3 | 87.7 | 86.3 | 85.6 | 87.2 | 85.6 | 83.8 | 84.8 | 72.2 |
| Yellowness Index | | 3.3 | 5.4 | 3.5 | 4.0 | 2.8 | 5.8 | 6.3 | 2.1 | 15.0 | 25.0 |
| x | | 0.3126 | 0.3148 | 0.3128 | 0.3133 | 0.3121 | 0.3150 | 0.3156 | 0.3117 | 0.3239 | 0.3338 |
| y | | 0.3197 | 0.3215 | 0.3199 | 0.3206 | 0.3195 | 0.3222 | 0.3223 | 0.3183 | 0.3319 | 0.3443 |
| L* | | 94.6 | 94.8 | 94.9 | 94.3 | 94.0 | 94.7 | 94.1 | 93.3 | 93.6 | 87.7 |
| a* | | −0.5 | −0.3 | −0.4 | −0.6 | −0.6 | −0.5 | −0.3 | −0.2 | −0.7 | −1.2 |

TABLE 2-continued

Properties of Glass Ceramics According to the Invention and Comparison
Glass Ceramics of Examples 9 and 10 (Glazing Program 1)

| | | Example No. | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| | | Glass No. | | | | | | | | | |
| | | 1 | 2 | 3 | 4 | 5 | 6 | 7 | 8 | 9 | 10 |
| b* | | 1.8 | 2.8 | 1.9 | 2.2 | 1.6 | 3.1 | 3.2 | 1.1 | 8.1 | 13.4 |
| C* | | 1.8 | 2.8 | 1.9 | 2.2 | 1.7 | 3.1 | 3.2 | 1.1 | 8.1 | 13.6 |
| IR Transmission 1600 nm | 4 mm Thickness % | 87.7 | 89.5 | 89.1 | 87.9 | 87.7 | 89.0 | 87.9 | 88.3 | 85.7 | 89.6 |
| $\alpha_{20/700}$ | $10^{-6}$/K | −0.26 | −0.05 | −0.10 | +0.03 | +0.11 | −0.07 | +0.10 | −0.05 | +0.14 | −0.07 |
| Density | g/cm$^3$ | 2.519 | 2.526 | 2.545 | 2.550 | 2.534 | 2.543 | 2.538 | 2.544 | 2.546 | 2.628 |
| X-Ray Diffraction: | | | | | | | | | | | |
| High-Quartz Phase Content | % | 73 | 72 | 71 | 68 | 71 | 76 | 72 | 71 | 75 | 71 |
| Crystallite Size | nm | 33 | 32 | 40 | 37 | 28 | 40 | 30 | 33 | 41 | 73 |
| Turbidity Haze | 3.6 mm Thickness % | 0.28 | 0.28 | 0.50 | 0.42 | 0.27 | 0.23 | 0.25 | 0.32 | 0.20 | 2.7 (milky) |

TABLE 3

Properties of Glass Ceramics According to the Invention and Comparison
Glass Ceramics of Examples 19 and 20 (Glazing Program 2)

| | | Example No. | | | | | | | | | |
| --- | --- | --- | --- | --- | --- | --- | --- | --- | --- | --- | --- |
| | | 11 | 12 | 13 | 14 | 15 | 16 | 17 | 18 | 19 | 20 |
| | | Glass No. | | | | | | | | | |
| | | 1 | 2 | 3 | 4 | 5 | 6 | 7 | 8 | 9 | 10 |
| Transmission Standard Illuminant C, 2° | 4 mm Thickness % | | | | | | | | | | |
| Light Transmission Y | | 86.5 | 86.6 | 86.8 | 86.1 | 85.6 | 87.6 | 85.1 | 84.0 | 85.4 | 69.9 |
| Yellowness Index | | 4.1 | 5.8 | 4.9 | 3.9 | 2.8 | 5.4 | 6.1 | 1.6 | 13.8 | 26.0 |
| x | | 0.3133 | 0.3152 | 0.3141 | 0.3131 | 0.3121 | 0.3146 | 0.3154 | 0.3112 | 0.3228 | 0.3351 |
| y | | 0.3207 | 0.3220 | 0.3214 | 0.3204 | 0.3195 | 0.3220 | 0.3222 | 0.3178 | 0.3307 | 0.3447 |
| L* | | 94.4 | 94.5 | 94.5 | 94.2 | 94.0 | 94.8 | 93.9 | 93.4 | 93.9 | 86.6 |
| a* | | −0.6 | −0.3 | −0.6 | −0.6 | −0.6 | −0.6 | −0.3 | −0.2 | −0.7 | −1.3 |
| b* | | 2.2 | 3.0 | 2.6 | 2.1 | 1.6 | 2.9 | 3.1 | 0.8 | 7.5 | 13.7 |
| C* | | 2.3 | 3.0 | 2.7 | 2.2 | 1.7 | 3.0 | 3.1 | 0.8 | 7.5 | 13.8 |
| Turbidity Haze | 3.6 mm Thickness % | 0.31 | 0.34 | 0.65 | 0.52 | 0.27 | 0.26 | 0.39 | 0.29 | 0.27 | 5.96 (milky) |

TABLE 4

Properties After Conversion into Keatite Glass Ceramic (Glazing Program 3)

| | | Example No. | | | | |
| --- | --- | --- | --- | --- | --- | --- |
| | | 21 | 22 | 23 | 24 | 25 |
| | | Glass No. | | | | |
| | | 1 | 2 | 3 | 4 | 5 |
| Maximum Temperature $T_{max}$ | °C. | 1110 | 1120 | 1100 | 1100 | 1110 |
| Transmission Standard Illuminant C, 2° | 3.6 mm Thickness | | | | | |
| Light Transmission Y | % | 6.0 | 9.0 | 5.0 | 6.4 | 8.7 |
| IR Transmission 1600 nm | % | 80.9 | 79.9 | 67.1 | 68.3 | 68.6 |
| Color (Remission) | 3.6 mm Thickness % | | | | | |
| L* | | 84.95 | 84.51 | 89.57 | 87.79 | 84.33 |
| a* | | −3.80 | −3.29 | −2.04 | −2.73 | −2.91 |
| b* | | −7.43 | −6.23 | −4.80 | −6.30 | −8.96 |
| c* | | 8.34 | 7.04 | 5.22 | 6.87 | 9.44 |

TABLE 4-continued

Properties After Conversion into Keatite Glass Ceramic (Glazing Program 3)

| | | | | | | |
|---|---|---|---|---|---|---|
| $\alpha_{20/700}$ | $10^{-6}/K$ | +0.86 | +0.91 | +1.2 | +1.26 | +0.95 |
| Density | g/cm³ | 2.515 | 2.515 | 2.538 | 2.544 | 2.512 |
| X-Ray Diffraction: | | | | | | |
| Keatite Phase Content | % | — | 88 | — | 83 | — |
| Keatite Crystallite Size | nm | | — | | >120 | |

| | | Example No. | | | | |
|---|---|---|---|---|---|---|
| | | 26 | 27 | 28 | 29 | 30 |
| | | | | Glass No. | | |
| | | 6 | 7 | 8 | 9 | 10 |
| Maximum Temperature $T_{max}$ | °C. | 1090 | 1100 | 1090 | 1080 | 1080 |
| Transmission Standard Illuminant C, 2° | 3.6 mm Thickness | | | | | |
| Light Transmission Y | % | 4.5 | 5.1 | 5.0 | 3.9 | 0.7 |
| IR Transmission 1600 nm | % | 49.8 | 54.5 | 58.6 | 56.1 | 4.9 |
| Color (Remission) | 3.6 mm Thickness % | | | | | |
| L* | | 90.91 | 88.75 | 87.22 | 87.32 | 96.08 |
| a* | | -1.71 | -1.14 | -1.52 | -1.02 | -0.01 |
| b* | | -2.98 | -5.17 | -7.56 | -2.36 | -1.27 |
| c* | | 3.44 | 5.30 | 7.71 | 2.57 | 1.27 |
| $\alpha_{20/700}$ | $10^{-6}/K$ | +1.00 | +1.00 | +1.02 | +1.05 | +1.33 |
| Density | g/cm³ | 2.513 | 2.513 | 2.522 | 2.516 | 2.593 |
| X-Ray Diffraction: | | | | | | |
| Keatite Phase Content | % | 86 | — | 85 | 89 | 70-75 |
| Keatite Crystallite Size | nm | 99 | | >120 | — | — |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 06 005 593.6, filed Mar. 20, 2006, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A lithium-aluminosilicate glass, which can be converted with glazing times of under 2.5 hours into a transparent glass ceramic with high-quartz mixed crystals as the prevailing crystal phase, which transparent glass ceramic has a turbidity of less than 1% according to ASTM D 1003 and has a neutral color shade, and a content in % by weight based on oxide of:

| | |
|---|---|
| $Li_2O$ | 3.0-4.5 |
| $Na_2O$ | 0-1.5 |
| $K_2O$ | 0-1.5 |
| $\Sigma Na_2O + K_2O$ | 0.2-2.0 |
| MgO | 0-2.0 |
| CaO | 0-1.5 |
| SrO | 0-1.5 |
| BaO | 0-2.5 |
| ZnO | 0-2.5 |
| $B_2O_3$ | 0-1.0 |
| $Al_2O_3$ | 19-25 |
| $SiO_2$ | 55-69 |
| $TiO_2$ | 1.4-2.7 |
| $ZrO_2$ | 1.3-2.5 |
| $SnO_2$ | 0-0.4 |
| $\Sigma SnO_2 + TiO_2$ | <2.7 |
| $P_2O_5$ | 0-3.0 |
| $Nd_2O_3$ | 0.01-0.4. |

CoO, in an amount greater than 0 to up to 40 ppm optionally with additions of chemical refining agents $As_2O_3$, $Sb_2O_3$ or $CeO_2$ or refining additives sulfate, chloride or fluoride compounds in total contents of up to 2.0% by weight.

2. The lithium-aluminosilicate glass according to claim 1, having a content (in % by weight based on oxide) of:

| | |
|---|---|
| $Li_2O$ | 3.2-4.3 |
| $Na_2O$ | 0.2-1.0 |
| $K_2O$ | 0-0.8 |
| $\Sigma Na_2O + K_2O$ | 0.3-1.5 |

-continued

| | |
|---|---|
| MgO | 0.1-1.5 |
| CaO | 0-1.0 |
| SrO | 0-1.0 |
| BaO | 0-2.5 |
| ZnO | 0-2.0 |
| $Al_2O_3$ | 19-24 |
| $SiO_2$ | 60-68 |
| $TiO_2$ | 1.4-2.7 |
| $ZrO_2$ | 1.3-2.2 |
| $SnO_2$ | 0-0.3 |
| $\Sigma SnO_2 + TiO_2$ | <2.7 |
| $P_2O_5$ | 0-1.5 |
| $Nd_2O_3$ | 0.02-0.3. |

CoO, in an amount greater than 0 to up to 30 ppm optionally with the additions of chemical refining agents or refining additives in total amounts of up to 1.5% by weight.

3. The lithium-aluminosilicate glass according to claim 1, having an MgO content of <0.8, by weight.

4. A glass ceramic, converted from a lithium-aluminosilicate glass with a composition according to claim 1.

5. A transparent glass ceramic converted from a lithium-aluminosilicate glass with a composition according to claim 1, with a content of $Nd_2O_3$<2000 ppm, CoO<20 ppm and a thermal expansion coefficient $\alpha_{20/700}$ of $0\pm0.5\cdot10^{-6}$/K, a light transmission with a thickness of 4 mm of greater than 80% and a variegation of colors in the CIELAB color system C*<3.5.

6. Fire protection glass, fireplace door windows, oven door windows, cooking surfaces with bottom coating or covers in the lighting sector comprising transparent glass ceramic, converted from a lithium-aluminosilicate glass with a composition according to claim 1.

7. The lithium-aluminosilicate glass according to claim 1, wherein the chemical refining agents are $As_2O_3$, $Sb_2O_3$, or $CeO_2$ and the refining additives are sulfate, chloride or fluoride compounds.

8. The lithium-aluminosilicate glass according to claim 2, wherein the chemical refining agents are $As_2O_3$, $Sb_2O_3$, or $CeO_2$ and the refining additives are sulfate, chloride or fluoride compounds.

9. The lithium-aluminosilicate glass according to claim 1, having an MgO content of <0.6, by weight.

10. A transparent glass ceramic converted from a lithium-aluminosilicate glass with a composition according to claim 1, with a content of $Nd_2O_3$<2000 ppm, CoO<20 ppm and a thermal expansion coefficient $\alpha_{20/700}$ of $0\pm0.3\cdot10^{-6}$/K, a light transmission with a thickness of 4 mm of greater than 80% and a variegation of colors in the CIELAB color system C*<3.5.

11. The lithium-aluminosilicate glass according to claim 1, having a CoO content in an amount of 1 ppm or more.

12. The lithium-aluminosilicate glass according to claim 1, having a CoO content in an amount of 1 ppm or more.

13. The lithium-aluminosilicate glass according to claim 2, having a CoO content in an amount of 1 ppm or more.

14. The lithium-aluminosilicate glass according to claim 1, having a CoO content in an amount of 1 ppm.

15. The lithium-aluminosilicate glass according to claim 1, having a CoO content in an amount of 1 ppm.

16. The lithium-aluminosilicate glass according to claim 2, having a CoO content in an amount of 1 ppm.

17. The lithium-aluminosilicate glass according to claim 1, having a CoO content in an amount of 5 ppm.

18. The lithium-aluminosilicate glass according to claim 1, having a CoO content in an amount of 5 ppm.

19. The lithium-aluminosilicate glass according to claim 2, having a CoO content in an amount of 5 ppm.

20. The lithium-aluminosilicate glass according to claim 1, having a $SnO_2$ content of 0.1-0.4% by weight based on oxide.

21. A transparent glass ceramic with high-quartz mixed crystals as the prevailing crystal phase, which has been prepared from a lithium-aluminosilicate glass according to claim 1 by converting said glass with glazing times of under 2.5 hours into the transparent glass ceramic.

* * * * *